US008719431B2

(12) United States Patent
Reif et al.

(10) Patent No.: US 8,719,431 B2

(45) Date of Patent: May 6, 2014

(54) TRANSIENT WLAN CONNECTION PROFILES

(75) Inventors: Alexander Jordan Reif, London (CA); Michael Montemurro, Toronto (CA); Kevin Oerton, Waterloo (CA); Denis Fedotenko, Waterloo (CA); Gerhard Dietrich Klassen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1081 days.

(21) Appl. No.: 11/876,428

(22) Filed: Oct. 22, 2007

(65) Prior Publication Data

US 2008/0147882 A1 Jun. 19, 2008

Related U.S. Application Data

(60) Provisional application No. 60/862,995, filed on Oct. 26, 2006.

(51) Int. Cl.
*G06F 15/16* (2006.01)

(52) U.S. Cl.
USPC ........... 709/229; 709/228; 709/250; 370/328; 370/338

(58) Field of Classification Search
USPC ........................................................ 709/250
See application file for complete search history.

(56) References Cited

U.S. PATENT DOCUMENTS 5,870,744 A 2/1999 Sprague
5,903,832 A 5/1999 Seppanen et al.
6,718,339 B2 * 4/2004 Eden .................................... 1/1
6,961,762 B1 11/2005 Yeap et al.
2002/0007407 A1 1/2002 Klein
2003/0003933 A1 1/2003 Deshpande et al.
2003/0219022 A1 11/2003 Dillon et al.
2004/0077341 A1 4/2004 Chandranmenon et al.
2004/0100973 A1 * 5/2004 Prasad .......................... 370/401
2004/0114601 A1 6/2004 Hiroyuki et al.
2004/0264427 A1 12/2004 Jaakkola et al.
2005/0181734 A1 8/2005 Coutts et al.
2005/0237967 A1 * 10/2005 Lee et al. ...................... 370/328
2005/0254435 A1 11/2005 Moakley et al.
2005/0260973 A1 11/2005 van de Groenendaal
2005/0260989 A1 11/2005 Pourtier et al.

(Continued)

FOREIGN PATENT DOCUMENTS

EP 0781064 6/1997
EP 1394988 3/2004

(Continued)

OTHER PUBLICATIONS

Savin, Daniela , Written Opinion of the International Searching Authority for PCT/CA2007/001887, Feb. 7, 2008.

(Continued)

*Primary Examiner* — Jackie Zuniga Abad
(74) *Attorney, Agent, or Firm* — Integral Intellectual Property Inc.; Miriam Paton

(57) ABSTRACT

A wireless local area network (WLAN) client device is able to store one or more transient connection profiles. A transient connection profile of a WLAN may be overwritten by a transient connection profile of another WLAN. A transient connection profile may be automatically deleted from the client device without user action having been taken to explicitly delete the transient connection profile.

6 Claims, 8 Drawing Sheets

300
WLAN CONTROLLER 312
RADIO 314
ANTENNA 316
WLAN INTERFACE 310
MEMORY 304
CODE 324
PERSISTENT CONNECTION PROFILE 318
TRANSIENT CONNECTION PROFILE 320
PRIORITIES 322
PROCESSOR 302
USER OUTPUT COMPONENT 308
USER INPUT COMPONENT 306

(56) References Cited

U.S. PATENT DOCUMENTS

| | | | | |
|---|---|---|---|---|
| 2005/0260996 | A1 | 11/2005 | van de Groenendaal | |
| 2006/0069760 | A1 | 3/2006 | Yeap et al. | |
| 2006/0075090 | A1* | 4/2006 | Bocking et al. | 709/224 |
| 2006/0168438 | A1 | 7/2006 | Klein | |
| 2006/0173844 | A1 | 8/2006 | Zhang et al. | |
| 2006/0174127 | A1 | 8/2006 | Kalavade et al. | |
| 2006/0209773 | A1 | 9/2006 | Sukhdeep et al. | |
| 2006/0242305 | A1 | 10/2006 | Alnas | |
| 2007/0067446 | A1* | 3/2007 | Jones et al. | 709/224 |
| 2007/0079013 | A1 | 4/2007 | Tumsi Dayakar et al. | |
| 2007/0130468 | A1 | 6/2007 | Cunningham et al. | |
| 2007/0208937 | A1 | 9/2007 | Cam-Winget et al. | |
| 2007/0264991 | A1 | 11/2007 | Jones et al. | |
| 2008/0281952 | A1 | 11/2008 | Fedotenko | |
| 2009/0300722 | A1 | 12/2009 | Haverinen et al. | |
| 2013/0128815 | A1 | 5/2013 | Scherzer et al. | |

FOREIGN PATENT DOCUMENTS

| | | |
|---|---|---|
| EP | 1395077 | 3/2004 |
| EP | 1638357 | 3/2006 |
| WO | 0141392 | 6/2001 |
| WO | WO-2004077752 | 9/2004 |
| WO | 2005020002 | 3/2005 |
| WO | 2005057860 | 6/2005 |
| WO | 2006004786 | 1/2006 |
| WO | 2006031927 | 3/2006 |
| WO | WO-2006066181 | 6/2006 |
| WO | 2006111951 | 10/2006 |

OTHER PUBLICATIONS

Elena, Mikhailova , Written Opinion of the International Searching Authority for PCT/CA2007/002074, Mar. 28, 2008.

"Wireless LAN Enhancements in Windows XP Service Pack 2", http://www.microsoft.com/technet/community/columns/cableguy/about.mspx 2008.

Garcia Bolos, Ruth, Extended European Search Report for EP 07845544.1, Oct. 27, 2009.

"iPhone user guide", http://en.wikipedia.org/wiki/AirPort, published Jun. 29, 2007.

Belkin Corporation: "User Manual F5D6020" 1-14, Jul. 17, 2003, XP002604419, http://cache-www.belkin.com/support/dl/f5d6020v3.pdf.

Planex Communications: "Airgo Wireless Adapter Installation and User Guide", Jul. 2004, XP002604418, http://www.planex.net/pdf/wireless/CQW-NS108AG_Manual_Eng.pdf, Chapters 2,3.

Matar, G., First Office Action for CA2,607,823, Oct. 25, 2010.

Straniero, Roberto, Extended European Search Report for EP 07816037.1, Nov. 18, 2010.

Ma, Cathy; First Office Action for CA 2,670,033, Oct. 19, 2011.

Planex Communications, Installation and User Guide(CQW-NS108AG), Jul. 31, 2004.

Ma, Cathy, Second Office Action for CA 2,670,033, Nov. 21, 2012.

Qian, Zijuan, Second Office Action for CN 200780039406.9, Dec. 5, 2012.

Utreja, Neeraj K., Fifth Office Action for U.S. Appl. No. 11/943,332, Nov. 15, 2012.

Utreja, Neeraj K., Second Office Action for U.S. Appl. No. 13/093,099, Oct. 29, 2012.

Qian, Zijuan , First Office Action for CN 200780039406.9, Mar. 1, 2012.

Garcia Bolos, Ruth, Second Exam Report for EP 07845544.1, Jul. 4, 2012.

Patel, R.B. et al., Mobile Agents in Wireless LAN and Cellular Data Networks, Journal of Computer Science, vol. 2, Issue 5, pp. 410-418, May 1, 2006.

Plata, Edd Rianne L., Final Office Action for U.S. Appl. No. 12/389,584, Feb. 1, 2012.

Yeow, Leslie, Third Office Action for CA 2,607,823, Aug. 13, 2012.

Yeow, Leslie, Second Office Action for CA 2,607,823, Aug. 1, 2011.

Planex Communications: "108 Mbps Wireless LAN PC Card", Installation and User Guide, Jul. 2004 , p. 20-22, XP002506563.

Casio, "User's Guide, Cassiopeia DT-10 Pegasus Setting", 2005 , 1-19.

Chin, Allan et al., "Seamless Connectivity to Wireless Local Area Networks", Intel Technology Journal, Wireless Technologies, vol. 7, No. 3, XP008109356, pp. 63-67, Aug. 19, 2003.

Garcia Bolos, Ruth, Extended European Search Report for EP 07845545.8, Oct. 29, 2009.

Garcia Bolos, Ruth, Extended European Search Report for EP 07845546.6, Nov. 2, 2009.

Garcia Bolos, Ruth, Second Exam Report for EP 07845543.3, May 5, 2009.

Garcia Bolos, Ruth, Third Exam Report for EP 07845543.3, Nov. 2, 2009.

Garcia Bolos, Ruth, Extended European Search Report for EP 07845543.3, Dec. 19, 2008.

Intel, "User Guide, Intel PRO/Wireless 2915ABG Network Connection", Jun. 2005.

Utreja, Neeraj K., Restriction Requirement for U.S. Appl. No. 11/943,332, Feb. 17, 2010.

Utreja, Neeraj K., Second Office Action for U.S. Appl. No. 11/943,332, Jul. 9, 2010.

Utreja, Neeraj K., Third Office Action for U.S. Appl. No. 11/943,332, Dec. 27, 2010.

Plata, Edd R., Office Action for U.S. Appl. No. 12/389,584, Sep. 27, 2011.

Utreja, Neeraj K., First Office Action for U.S. Appl. No. 13/027,823, Dec. 29, 2011.

Utreja, Neeraj K., First Office Action for U.S. Appl. No. 13/093,099, Dec. 22, 2011.

Widhalm, Angela M., Advisory Action for U.S. Appl. No. 11/943,332, Mar. 15, 2013.

Widhalm, Angela M., Advisory Action for U.S. Appl. No. 13/093,099, Feb. 14, 2013.

Winder, Patrice L., Second Office Action for U.S. Appl. No. 13/027,823, Jul. 12, 2013.

* cited by examiner

TRANSIENT WLAN CONNECTION PROFILES

CROSS-REFERENCE TO RELATED APPLICATIONS

This application claims priority under 35 USC 119(e) from U.S. Provisional Patent Application No. 60/862,995, filed Oct. 26, 2006, and which is incorporated by reference herein.

BACKGROUND

A wireless local area network (WLAN) client device may store in its memory one or more persistent connection profiles of wireless local area networks. A persistent connection profile may include, for example, the service set identity (SSID) of the network, WLAN configuration parameters, security credentials, and Internet Protocol (IP) network parameters. The SSID is also known as the network name. The persistent connection profiles may be assigned priorities, for example, by a user that has purchased the client device, a carrier who controls the sale of the client device, or an administrator of an enterprise that has purchased the client device. Generally, user action is required to delete a persistent connection profile from a client device.

Scanning is the process of identifying existing networks. SSIDs in scan results are compared to the SSIDs of one or more of the persistent connection profiles stored in the client device. The order in which SSIDs of the persistent connection profiles are compared to the SSIDs in the scan results may be determined by one or more factors. For example, the SSIDs of the persistent connection profiles may be compared in order of decreasing priority for the persistent connection profiles. In another example, the SSIDs in the scan results may be compared in order of decreasing received signal strength. If there is a match, a WLAN controller of the client device may initiate an authentication process and, if the authentication process is successful, may initiate an association or re-association process with an access point (AP) or, in the case of an ad hoc network, another WLAN client device that carries the wireless local area network the SSID of which matches the SSID of one of the persistent connection profiles. If the comparison does not yield any matches, but there are scan results, the client device may present a list of identified networks (based on the SSIDs in the scan results) to the user of the client device, so that the user can select which, if any, of the networks to join. If there are no scan results, the client device may have its radio enter a low-power state for a period of time, until more scanning is to be done.

If the user of the client device selects an identified network to join, the user may be prompted to enter connection parameters in order to successfully connect to the selected network. A non-exhaustive list of examples for the connection parameters includes WLAN configuration parameters, security credentials, Internet Protocol (IP) network parameters, or any combination thereof. The user may also be prompted whether to save these connection parameters and the SSID of the selected network in a new persistent connection profile. Once saved, the new persistent connection profile is not deleted from the client device until explicit user action is taken to do so. The user may also be able to set the relative priority of the new persistent connection profile. If the user chooses not to save these connection parameters and the SSID of the selected network in a persistent connection profile, then the next time the user selects that identified network to join, the user may be prompted to once again enter the connection parameters in order to successfully connect to the selected network.

Consider a scenario where a user travels by airplane to a three-day conference. The user's client device may connect to a WLAN in an airport lounge, to another WLAN at the hotel and to yet another WLAN at the conference center. If the user chooses to save persistent connection profiles for each of these WLANs, then there will be three additional persistent connection profiles stored in the client device. Until such time as the user explicitly deletes these profiles, they will be compared to the scan results if there is no match to a higher priority profile. If the user chooses not to save persistent connection profiles for these WLANs, then the user will be required to reenter the connection parameters on each occasion that the client device is connecting to the WLAN.

For battery-operated client devices, the process of network discovery and association in a timely manner consumes significant battery life.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

A wireless local area network (WLAN) client device is able to store one or more transient connection profiles. A transient connection profile of a WLAN may be overwritten by a transient connection profile of another WLAN.

Figure 1:
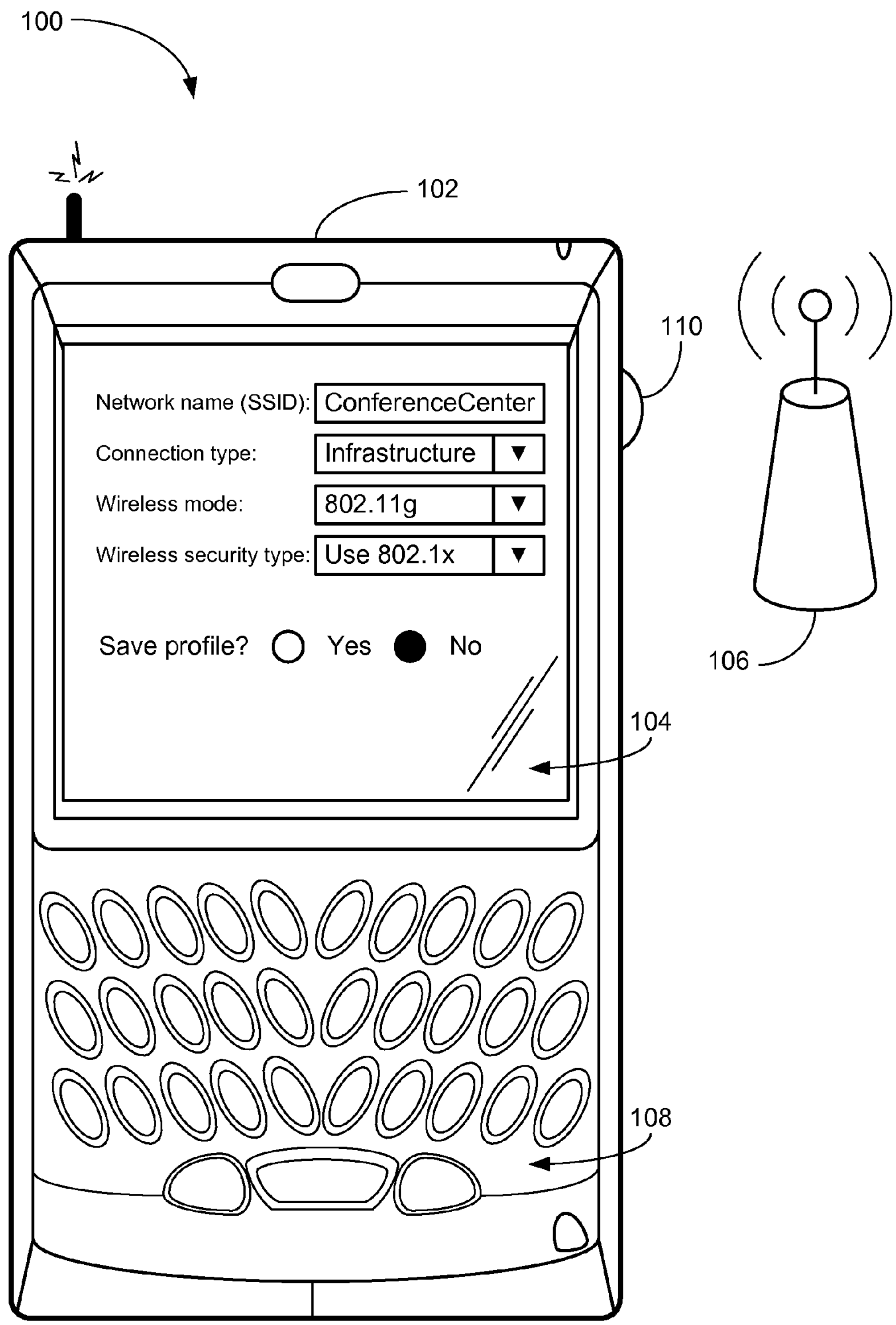
FIG. 1 is an illustration of an exemplary communication system.

FIG. 1 illustrates an exemplary communication system 100. A WLAN client device 102 may scan for wireless local area networks. Client device 102 may already store one or more persistent connection profiles. If the scan results do not match any of the stored persistent connection profiles, the identified networks may be presented to the user via a user output element of client device 102, for example, a display 104. For example, if the user is at a conference, a WLAN with the SSID "ConferenceCenter" may be detected, since client device 102 is in the coverage area of an access point 106 that is carrying this WLAN. The user may select one of the identified networks via a user input element of client device 102, for example, a keyboard 108 or a thumbwheel 110. The user may be prompted to enter connection parameters in order to successfully connect to the selected network. A non-exhaustive list of examples for the connection parameters includes WLAN configuration parameters, security credentials, IP network parameters, or any combination thereof. For example, as shown in FIG. 1, the user may select an Infrastructure connection type, an IEEE 802.11g wireless mode, and IEEE 802.1x authentication for the security type for the WLAN having the SSID "ConferenceCenter". The user may also be prompted whether to save these connection parameters and the SSID of the selected network in a new persistent connection profile.

If the user chooses not to save the connection parameters and the SSID of the selected network in a new persistent connection profile, they may be saved instead in client device 102 in a transient connection profile. If client device 102 is disconnected from the WLAN and then subsequently scans for wireless local area networks while in the coverage area of AP 106 or any other AP carrying the WLAN, the scan results will be compared to this transient connection profile, and since there is a match, client device 102 will attempt to connect to the WLAN using the connection parameters in the transient connection profile. The user will therefore be spared having to re-enter those connection parameters, as would have been the case had the connection parameters not been stored in client device 102.

Figure 2:
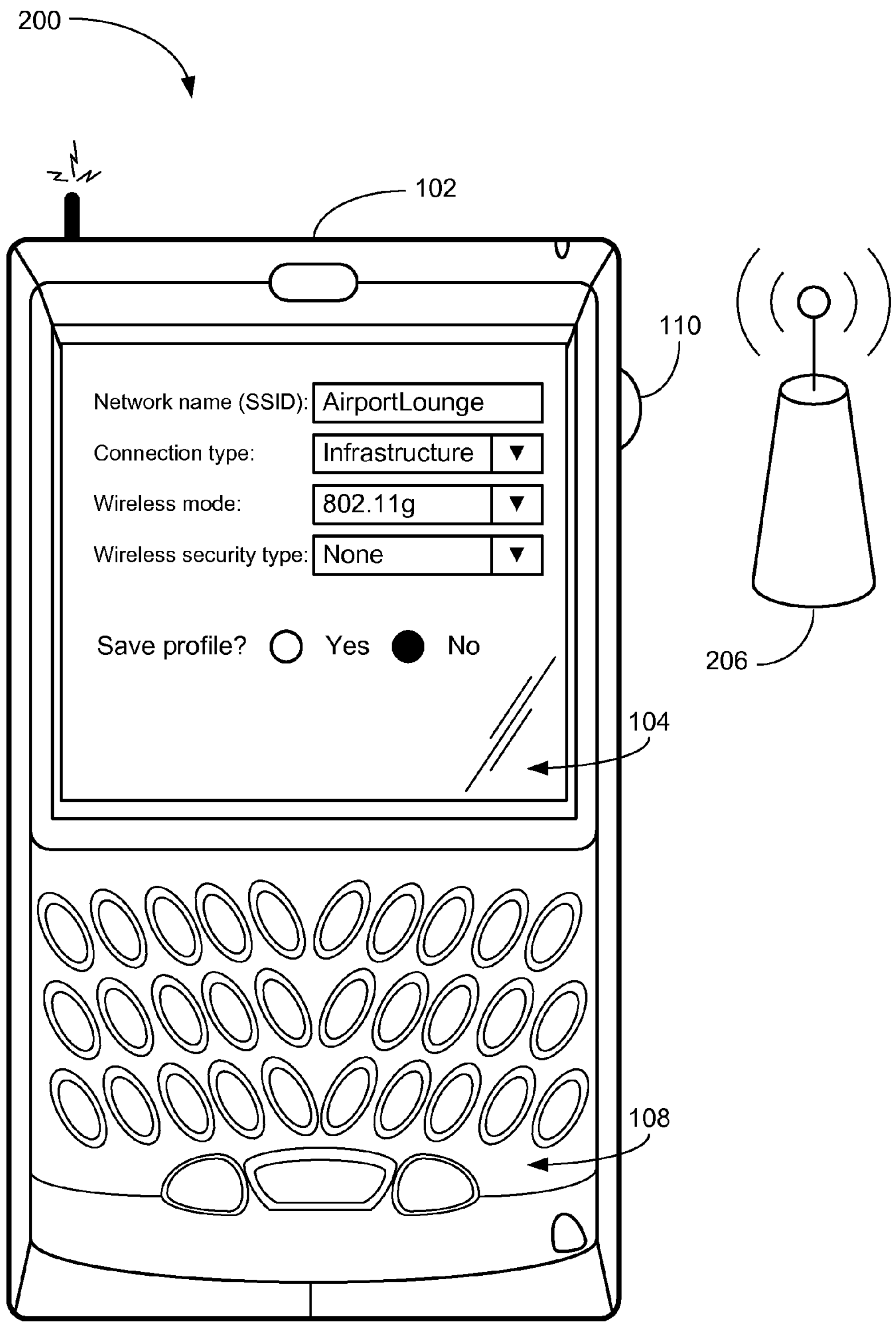
FIG. 2 is an illustration of yet another exemplary communication system.

FIG. 2 illustrates an exemplary communication system 200. Once the user leaves the conference center, the next place where client device 102 may detect a wireless local area network for which no connection profiles are stored is at the airport, where client device 102 is in the coverage area of an access point 206 that is carrying a WLAN with the SSID "AirportLounge". The user may select the identified networks via a user input element of client device 102, for example, keyboard 108 or thumbwheel 110. The user may be prompted to enter connection parameters in order to successfully connect to the selected network. For example, as shown in FIG. 2, the user may select an Infrastructure connection type, an IEEE 802.11g wireless mode, and no encryption for the security type for the WLAN having the SSID "AirportLounge". The user may also be prompted whether to save these connection parameters and the SSID of the selected network in a new persistent connection profile.

If the user chooses not to save the connection parameters and the SSID of the selected network in a new persistent connection profile, they may be saved instead in client device 102 in a transient connection profile. If client device 102 is capable of storing only one transient connection profile at a time, then at this point, the data in the transient connection profile from the WLAN at the conference center is overwritten with the connection parameters and the SSID of the WLAN at the airport. The user of client device 102 is therefore spared having to explicitly delete the connection profile for the WLAN at the conference center. Even if client device 102 is capable of having more than one transient connection profile stored concurrently therein, at some point in time the transient connection profile storing the connection parameters and SSID for the WLAN at the conference center will be overwritten with the connection parameters and SSID of another WLAN. Client device 102 may automatically delete the transient connection profile after a period of time has elapsed, without an explicit user action to delete the transient connection profile. For example, client device 102 may automatically delete a transient connection profile once a certain period of time, for example, 24 hours, has elapsed since a most recent disconnection of client device 102 from a WLAN described in the transient connection profile. In another example, client device 102 may automatically delete a transient connection profile once a certain period of time, for example, 24 hours, has elapsed since a most recent connection of client device 102 from a WLAN described in the transient connection profile. The transient connection profile may include a timestamp indicating the latest time at which the client device connected to or disconnected from the network described in the profile.

Figure 3:
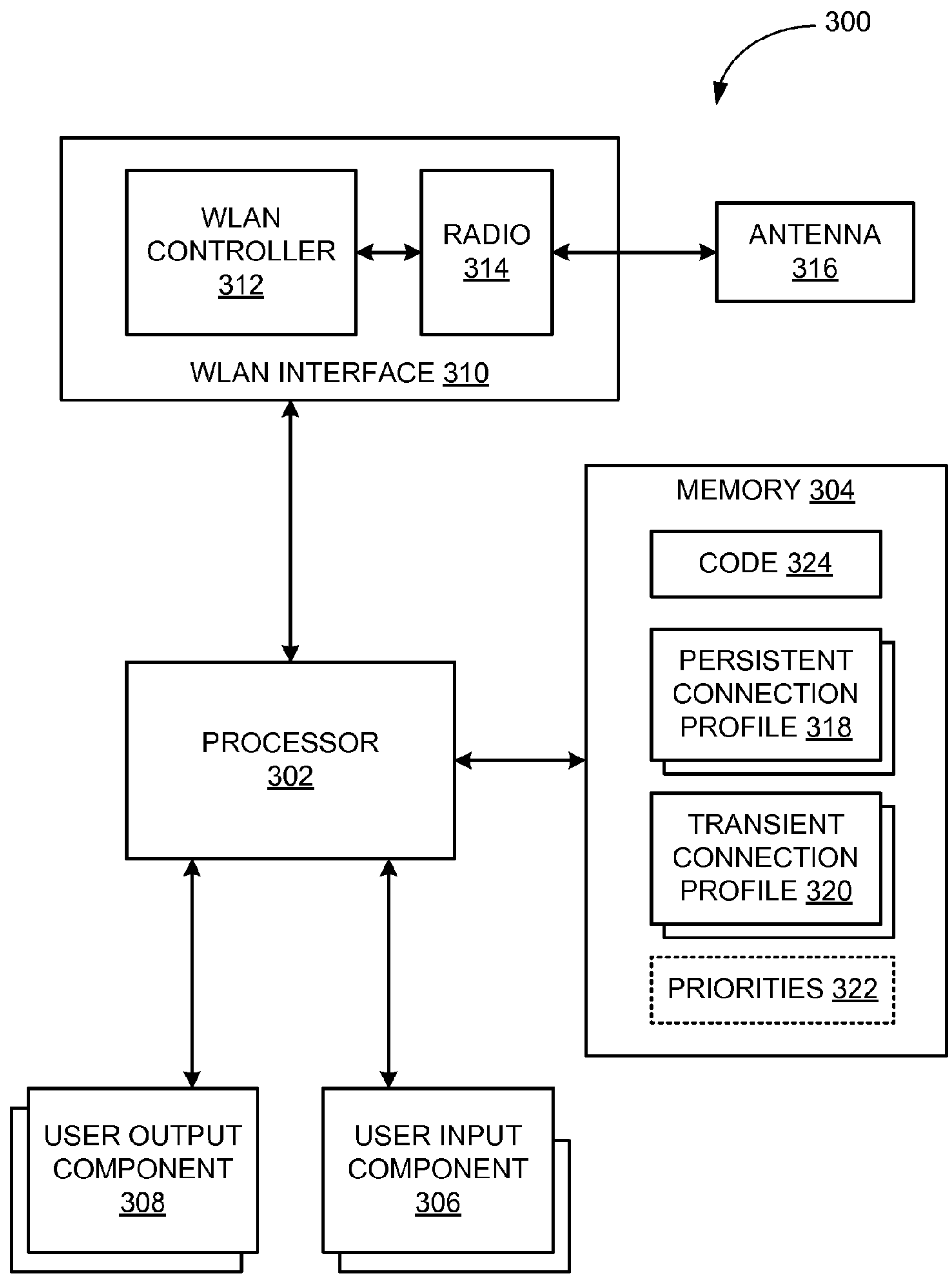
FIG. 3 is a block diagram of an exemplary client device.

FIG. 3 is a block diagram of an exemplary client device. A client device 300 comprises a processor 302, and a memory 304 coupled to processor 302. Client device 300 also comprises one or more user input components 306 coupled to processor 302 and one or more user output components 308 coupled to processor 302. A non-exhaustive list of examples for user input components 306 includes a keyboard, a thumbwheel, a microphone, a trackball, a joystick, a touch sensitive display, and the like, or any combination thereof. A non-exhaustive list of examples for user output components 308 includes a display, a speaker, and the like, or any combination thereof.

Client device 300 comprises a WLAN interface 310, compatible with one or more WLAN standards, for example, one or more of the IEEE 802.11 wireless communication standards, or one or more of the ETSI HiperLAN wireless communication standards. WLAN interface 310 is coupled to processor 302 and includes at least a WLAN controller 312 and a radio 314. Client device 300 also comprises an antenna 316 coupled to radio 314. For example, client device 300 may be able to communicate with APs or, in the case of ad hoc networks, other WLAN client devices, via WLAN interface 310 and antenna 316.

Memory 304 is able to store one or more persistent connection profiles 318 and one or more transient connection profiles 320. Memory 304 may also be able to store priorities 322 for the profiles as a factor in determining the order in which scan results are compared to the profiles, as a factor in determining the order in which scanning for a wireless local area network matching a particular profile is done, or both. A WLAN for which an SSID and connection parameters are stored in a connection profile 318 or 320 may be an infrastructure WLAN or an ad hoc WLAN.

Memory 304 stores code 324 that, when executed by processor 302, may implement the methods described herein together with WLAN controller 312.

Client device 300 includes other components that, for clarity, are not shown in FIG. 3. A non-exhaustive list of examples for client device 300 includes a wireless-enabled laptop computer, a wireless-enabled tablet computer, a wireless-enabled cellphone, a wireless-enabled personal digital assistant (PDA), a wireless-enabled smart phone, a wireless-enabled video camera/monitor, a wireless-enabled gaming/multimedia console, a wireless-enabled sensor/reporting/storage device, a wireless Internet Protocol (IP) phone and any other suitable WLAN client device.

Figure 4:
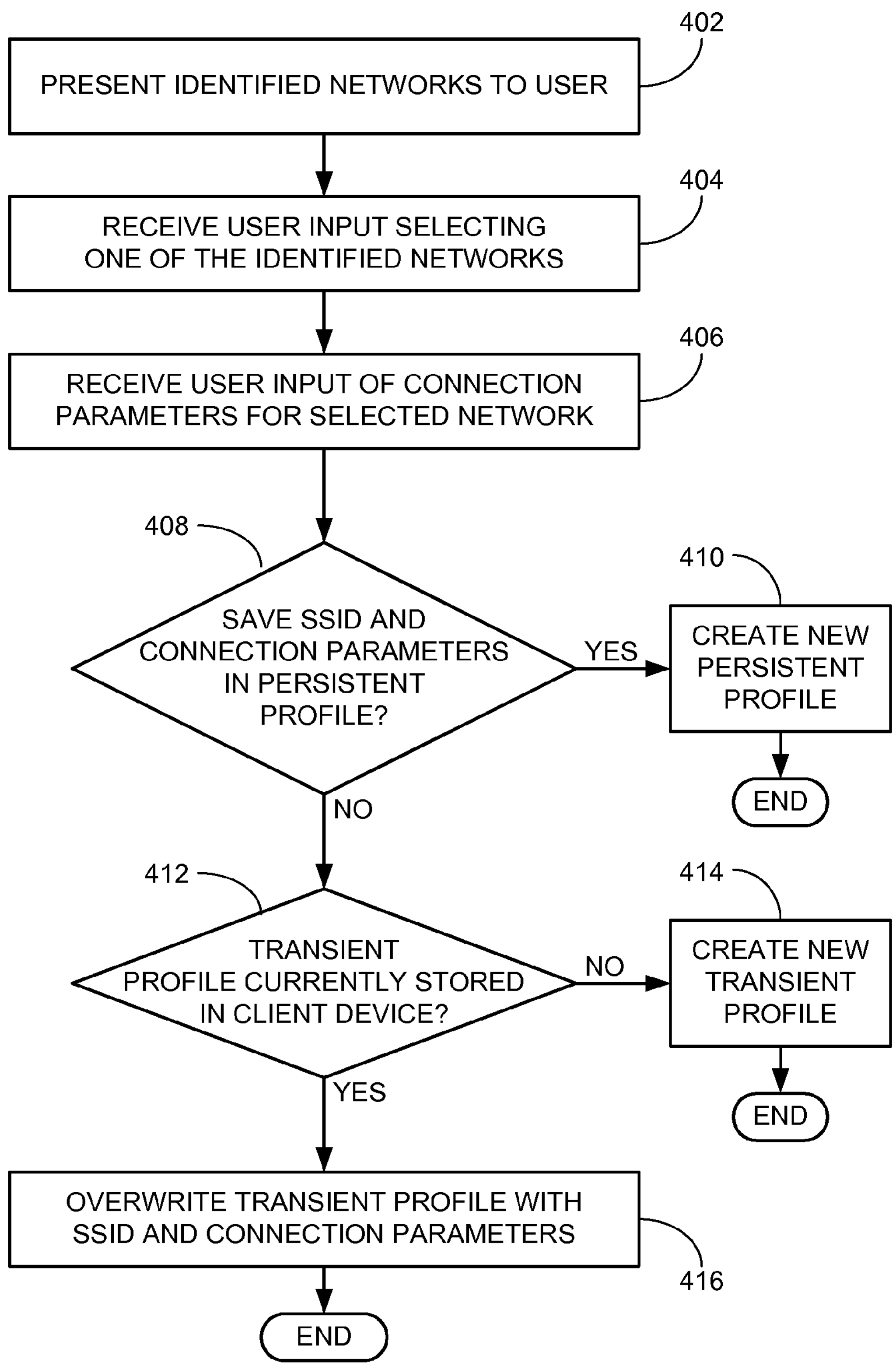
FIGS. 4-6 are flowcharts of exemplary methods for handling identified networks.
Figure 5:
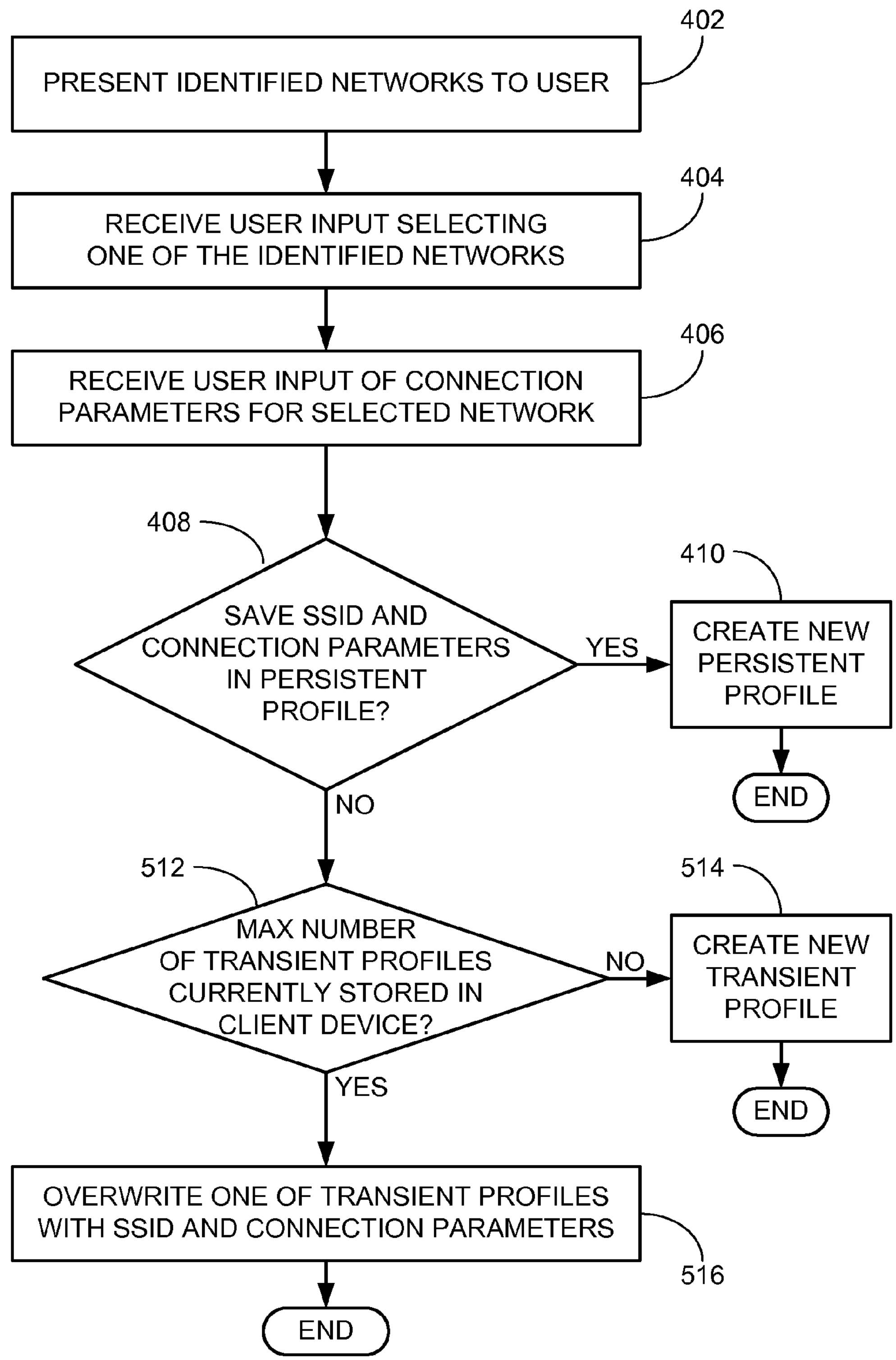
Figure 6:
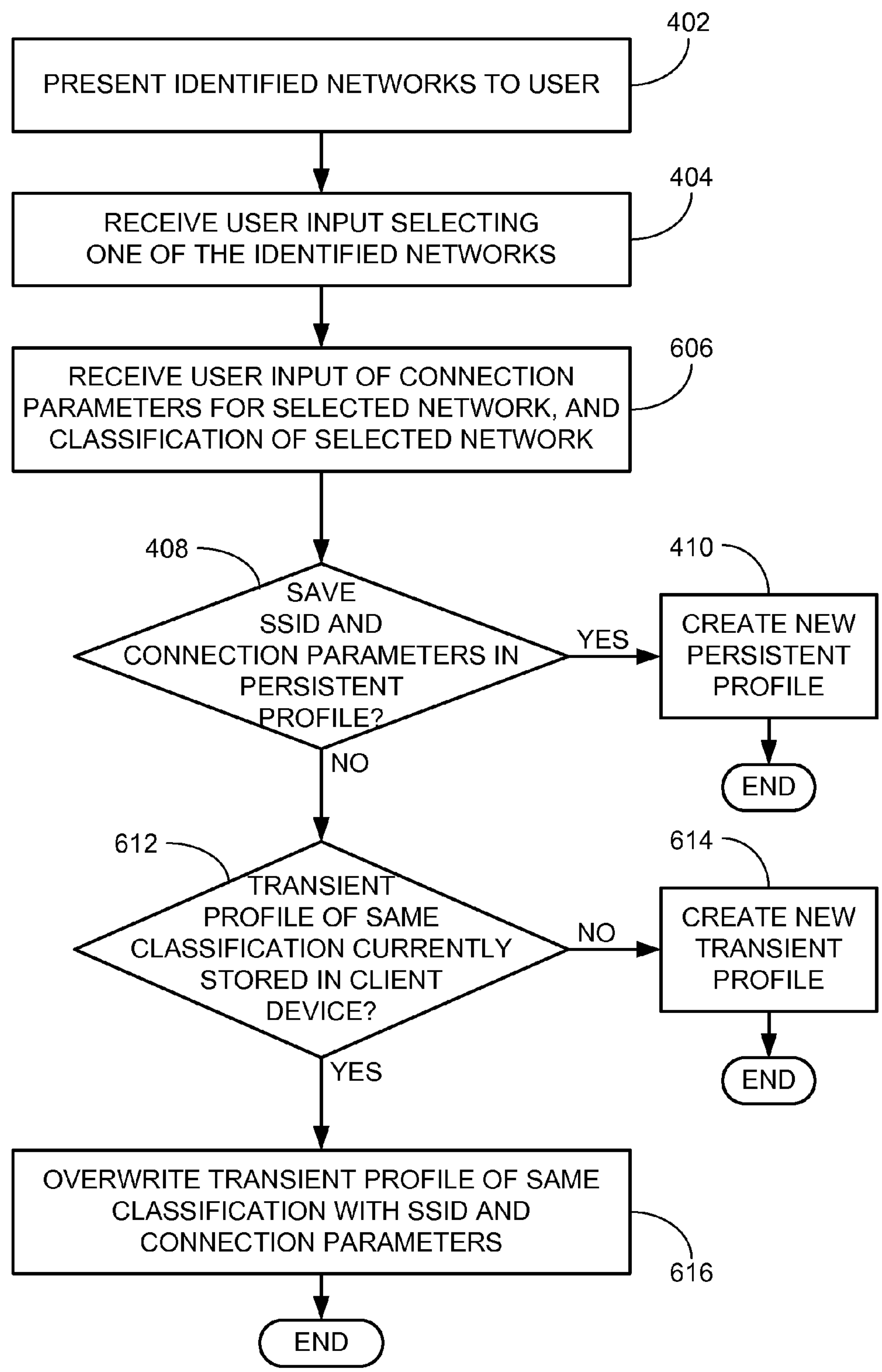

FIGS. 4-6 are flowcharts of exemplary methods for handling identified networks. Elements of methods of FIGS. 4-6 that are similar are given the same reference numerals and are generally described only once in the following description. The method of FIG. 4 assumes a limit of one transient connection profile per client device. The method of FIG. 5 assumes a limit of N transient connection profiles per client device, where N is a whole number greater than or equal to 2. The method of FIG. 6 assumes that transient connection profiles are classified and a limit of one transient connection profile per classification per client device. A limit of N transient connection profiles per classification per client device is also contemplated, where N is a whole number greater than or equal to 2. However, it will obvious to a person of ordinary skill in the art how to modify the method of FIG. 6 to accommodate a limit of N transient connection profiles per classification per client device.

Referring first to FIG. 4, at 402, the client device presents the identified networks to the user. For example, a list of the SSIDs of the identified networks may be displayed on a display of the client device. At 404, the client device receives user input selecting one of the identified networks. For example, the user may use a user input device such as a keyboard, a trackball or a thumbwheel to scroll in the list and to select one of the SSIDs in the list.

The user will be prompted by the client device to enter connection parameters for the selected network, and at 406 the client device will receive those connection parameters. The user may be prompted by the client device whether to save the connection parameters in a persistent connection profile. The user's choice may also be received by the client device at 406. Alternatively, the user may be prompted by the client device whether to save the connection parameters in a persistent connection profile after the parameters have been received by the client device at 406.

If the user has chosen to save the SSID of the selected network and the connection parameters in a persistent connection profile, as checked at 408, then at 410, the client device creates a new persistent connection profile with the SSID of the selected network and the connection parameters. Otherwise, the client device will check at 412 whether a transient connection profile is currently stored in the client device. If not, then the client device creates at 414 a new transient connection profile with the SSID of the selected network and the connection parameters received at 406. The priority of the new transient connection profile may be set by default to the lowest priority, although the user may be able to adjust the priority of the new transient connection profile. Other schemes for setting the priority of the new transient connection profile are also contemplated. If a transient connection profile is currently stored in the client device, then the client device overwrites the stored transient connection profile at 416 with the SSID of the selected network and the connection parameters received at 406.

Referring now to FIG. 5, if the user has chosen not to save the SSID of the selected network and the connection parameters in a persistent connection profile, as checked at 408, then the client device will check at 512 whether a maximum number of transient connection profiles are currently stored in the client device. If not, then the client device creates at 514 a new transient connection profile with the SSID of the selected network and the connection parameters received at 406. The priority of the new transient connection profile may be set by default to the lowest priority, although the user may be able to adjust the priority of the new transient connection profile. Other schemes for setting the priority of the new transient connection profile are also contemplated.

If the maximum number of transient connection profiles are currently stored in the client device, then the client device overwrites one of the transient connection profiles at 516 with the SSID of the selected network and the connection parameters received at 406. The transient connection profiles may include a timestamp indicating the latest time at which the client device connected to or disconnected from the network described in the profile, and the transient connection profile with the least recent timestamp may be the one which is overwritten at 516.

Referring now to FIG. 6, after the user has selected one of the identified networks at 404, the user will be prompted by the client device to enter connection parameters for the selected network, and at 606 the client device will receive those connection parameters. The user may also specify a classification for the selected network. For example, the user may classify the selected network as a conference network or a hotel network or an airport lounge network. The user may be prompted by the client device whether to save the connection parameters in a persistent connection profile. The user's choice may also be received by the client device at 606. Alternatively, the user may be prompted by the client device whether to save the connection parameters in a persistent connection profile after the connection parameters have been received by the client device at 606.

If the user has chosen to save the SSID of the selected network and the connection parameters in a persistent connection profile, as checked at 408, then at 410, the client device creates a new persistent connection profile with the SSID of the selected network and the connection parameters. Otherwise, the client device will check at 612 whether a transient connection profile of the same classification is currently stored in the client device. If not, then the client device creates at 614 a new transient connection profile with the SSID of the selected network and the connection parameters received at 606. The new transient connection profile is classified with the classification specified by the user at 606. The priority of the new transient connection profile may be set by default to the lowest priority, although the user may be able to adjust the priority of the new transient connection profile. Other schemes for setting the priority of the new transient connection profile are also contemplated. If a transient connection profile of the same classification is currently stored in the client device, then the client device overwrites that transient connection profile at 616 with the SSID of the selected network and the connection parameters received at 606.

For example, a user of a client device may visit an airport lounge and a transient connection profile for the WLAN at the airport lounge may be created. The user may arrive at a hotel, and a separate transient connection profile for the WLAN at the hotel may be created. The user may then attend a three-day conference, and a separate transient connection profile for the WLAN at the conference center may be created. When the user then moves to a different hotel, the transient connection profile classified "hotel" may be overwritten with information of the WLAN at the different hotel. The next time the user attends a conference, the transient connection profile classified "conference" may be overwritten with information of the WLAN at the new conference.

The methods of FIGS. 4-6 all assume that if the user of the client device has not chosen to save the SSID and connection parameters of the selected network in a persistent connection profile, then this information should automatically be stored in a transient connection profile. In other implementations, the user may be asked explicitly whether to save the SSID and connection parameters of the selected network in a transient connection profile. If the user chooses not to save the information in a persistent connection profile and not to save the information in a transient connection profile, the information will not be saved.

Figure 7:
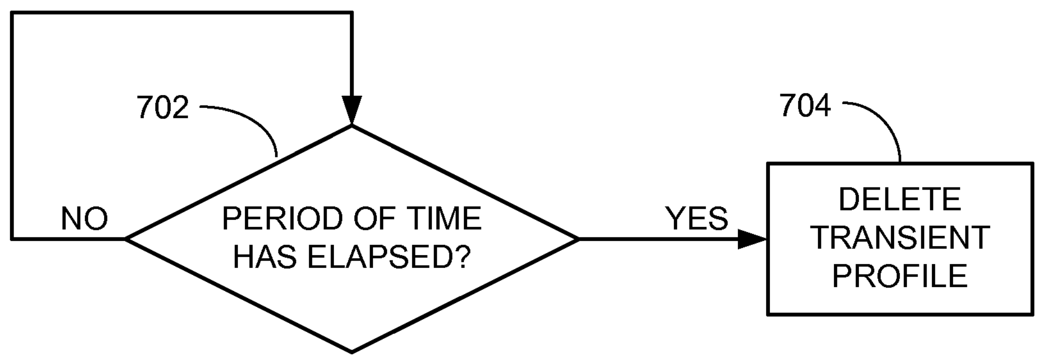
FIG. 7 is a flowchart of an exemplary method for handling transient connection profiles.

FIG. 7 is a flowchart of an exemplary method for handling transient connection profiles. As mentioned above, a transient connection profile may include a timestamp indicating the latest time at which the client device connected to or disconnected from the network described in the profile. If a certain period of time, for example, 24 hours, has elapsed since a most recent connection to or disconnection from a WLAN described in the profile, as checked at 702, this may trigger the client device to automatically delete at 704 the transient connection profile from the memory of the client device, without an explicit user action to delete the transient connection profile.

Figure 8:
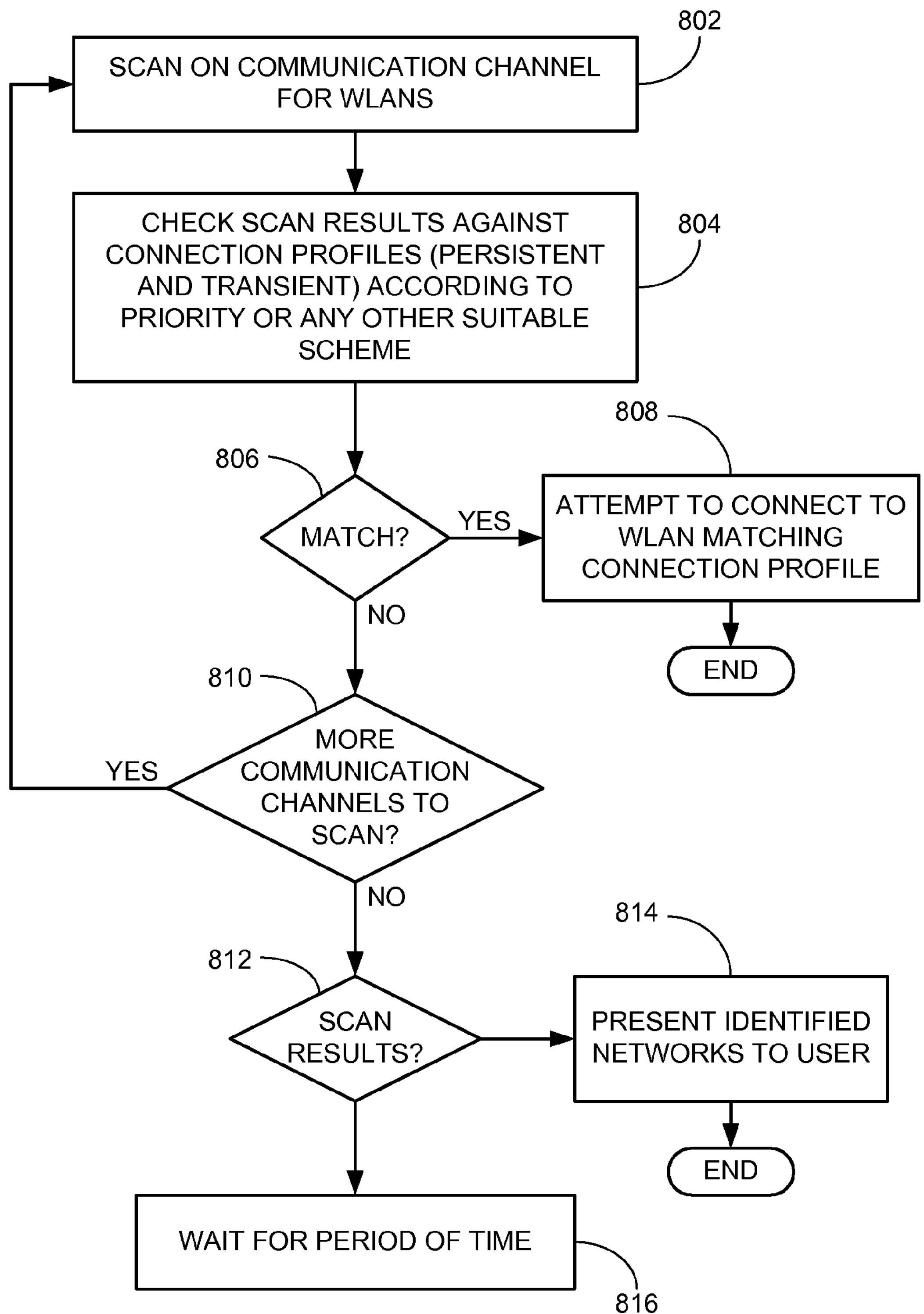
FIG. 8 is a flowchart of an exemplary method for scanning for wireless local area networks.

FIG. 8 is a flowchart of an exemplary method for scanning for wireless local area networks. At 802, the WLAN controller of a client device scans on a communication channel for wireless local area networks. The scanning may be passive or active or involve a combination of the two types. Any suitable scanning algorithm may be used at 802.

At 804, the client device checks the scan results against the persistent connection profiles and the transient connection profile(s) that are stored in the client device. The order in which the connection profiles are checked against the scan results may be determined according to any suitable scheme. The relative priorities assigned to the connection profiles may be a factor in determining this order. The received signal strengths of the scan results may be a factor in determining this order.

If there is a match, as checked at 806, then the client device attempts at 808 to connect to the WLAN that matches the connection profile. The attempt may involve initiating an authentication process and, if the authentication process is successful, initiating an association or re-association process with an AP, or in the case of an ad hoc network, another WLAN client device, the WLAN of which is identified in the matching scan results. The details of this are beyond the scope of this document.

If there is no match but there are additional communication channels to scan, as checked at 810, then the method resumes from 802. If all suitable communication channels have been scanned without resulting in a matched connection profile, and there were indeed scan results (checked at 812), the client device may present the identified networks to a user of the client device at 814. If there were no scan results (which will occur, for example, when the client device is out of coverage), then the client device may wait for a period of time at 816. When this period of time (the "back-off" period) has elapsed, the method may resume from 802. The back-off period may be fixed, or may vary from one scan session to another. For example, successive scan sessions may be separated by increasing periods of time, subject to an upper limit. The client device may enter a lower power state during all or part of the back-off period.

Although the subject matter has been described in language specific to structural features, methodological acts or both, it is to be understood that the subject matter defined in the appended claims is not necessarily limited to the specific features or acts described above. Rather, the specific features and acts described above are disclosed as example forms of implementing the claims.

What is claimed is:

1. A method in a wireless local area network client device, the method comprising:

receiving a first indication via a user input component of the wireless local area network client device not to store a persistent connection profile of a first wireless local area network having a first network name, and in response to receiving the first indication, storing in the wireless local area network client device a transient connection profile of the first wireless local area network, the transient connection profile including the first network name;

while the transient connection profile of the first wireless local area network is stored in the wireless local area network client device, comparing scan results from scanning for wireless local area networks to the transient connection profile of the first wireless local area network;

receiving a second indication via the user input component not to store a persistent connection profile of a second wireless local area network having a second network name that differs from the first network name, and in response to receiving the second indication, automatically deleting the transient connection profile of the first wireless local area network from the wireless local area network client device by overwriting the transient connection profile of the first wireless local area network with a transient connection profile of the second wireless local area network, the transient connection profile of the second wireless local area network including the second network name; and while the transient connection profile of the second wireless local area network is stored in the wireless local area network client device, comparing scan results from scanning for wireless local area networks to the transient connection profile of the second wireless local area network.

2. The method of claim 1, wherein the first wireless local area network and the second wireless local area network are classified with the same classification.

3. The method of claim 1, wherein the wireless local area network client device is able to have more than one transient connection profile stored concurrently in the wireless local area network client device.

4. A method in a wireless local area network client device, the method comprising:

storing in the wireless local area network client device a transient connection profile of a first wireless local area network, the transient connection profile including a first network name, and automatically assigning a lower priority to the transient connection profile of the first wireless local area network than that assigned to any persistent connection profiles stored in the wireless local area network client device;

while the transient connection profile of the first wireless local area network is stored in the wireless local area network client device, comparing scan results from scanning for wireless local area networks to the transient connection profile of the first wireless local area network;

automatically deleting the transient connection profile of the first wireless local area network from the wireless local area network client device by overwriting the transient connection profile with a transient connection profile of a second wireless local area network having a second network name that differs from the first network name, the transient connection profile of the second wireless local area network including a network name of the second wireless local area network, and automatically assigning a lower priority to the transient connection profile of the second wireless local area network than that assigned to any persistent connection profiles stored in the wireless local area network client device; and while the transient connection profile of the second wireless local area network is stored in the wireless local area network client device, comparing scan results from scanning for wireless local area networks to the transient connection profile of the second wireless local area network.

5. A client device comprising:

a processor;

a wireless local area network interface coupled to the processor, the wireless local area network interface comprising a wireless local area network controller and a radio;

an antenna coupled to the radio;

a user input component coupled to the processor, arranged to receive a first indication not to store a persistent connection profile of a first wireless local area network having a first network name and, at a later time, to receive a second indication not to store a persistent connection profile of a second wireless local area network having a second network name that differs from the first network name;

a memory coupled to the processor, the memory arranged to store one or more persistent connection profiles of wireless local area networks and arranged to store executable code that, when executed by the processor, stores a transient connection profile of the first wireless local area network in response to receiving the first indication, the transient connection profile including the first network name, and, in response to receiving the second indication automatically deletes the transient connection profile of the first wireless local area network from the client device by overwriting the transient connection profile of the first wireless local area network with a transient connection profile of the second wireless local area network, the transient connection profile of the second wireless local area network including the second network name, wherein while the transient connection profile of the first wireless local area network is stored in the memory, the client device is arranged to compare scans results generated by the wireless local area network controller when scanning for wireless local area networks to the transient connection profile of the first wireless local area network, and while the transient connection profile of the second wireless local area network is stored in the memory, the client device is arranged to compare scans results generated by the wireless local area network controller when scanning for wireless local area networks to the transient connection profile of the second wireless local area network.

6. A client device comprising:

a processor;

a wireless local area network interface coupled to the processor, the wireless local area network interface comprising a wireless local area network controller and a radio;

an antenna coupled to the radio; and a memory coupled to the processor, the memory arranged to store one or more persistent connection profiles of wireless local area networks and arranged to store a transient connection profile of a first wireless local area network having a first network name, the transient connection profile including the first network name, and arranged to store executable code that, when executed by the processor, automatically assigns a lower priority to the transient connection profile of the first wireless local area network than that assigned to any persistent connection profiles stored in the client device, and wherein the executable code, when executed by the processor, automatically deletes the transient connection profile of the first wireless local area network from the client device by overwriting the transient connection profile of the first wireless local area network with a transient connection profile of a second wireless local area network having a second network name that differs from the first network name, the transient connection profile of the second wireless local area network including the second network name, and automatically assigns a lower priority to the transient connection profile of the second wireless local area network than that assigned to any persistent connection profiles stored in the client device, wherein while the transient connection profile of the first wireless local area network is stored in the memory, the client device is arranged to compare scans results generated by the wireless local area network controller when scanning for wireless local area networks to the transient connection profile of the first wireless local area network, and while the transient connection profile of the second wireless local area network is stored in the memory, the client device is arranged to compare scans results generated by the wireless local area network controller when scanning for wireless local area networks to the transient connection profile of the second wireless local area network.

* * * * *